United States Patent [19]

Sugaya et al.

[11] Patent Number: 5,300,204
[45] Date of Patent: Apr. 5, 1994

[54] METHOD FOR HYDROGEN ION-SELECTIVE ELECTRODIALYSIS

[75] Inventors: Yoshio Sugaya; Misaki Tada; Haruhisa Miyake, all of Yokohama, Japan

[73] Assignee: Asahi Glass Company Ltd., Tokyo, Japan

[21] Appl. No.: 18,384

[22] Filed: Feb. 17, 1993

[30] Foreign Application Priority Data

Feb. 19, 1992 [JP] Japan ................... 4-69534

[51] Int. Cl.$^5$ .................. C25B 7/00; B01D 61/44; B01D 61/46
[52] U.S. Cl. ......................... 204/182.4; 204/301
[58] Field of Search ............. 204/824, 825, 826, 296, 204/301; 521/27

[56] References Cited

U.S. PATENT DOCUMENTS

| | | |
|---|---|---|
| 4,024,043 | 5/1977 | Dege et al. . |
| 4,116,889 | 9/1978 | Chlanda et al. . |
| 4,851,100 | 7/1989 | Hodgdon et al. ............. 204/296 |
| 5,128,378 | 7/1992 | Sugayo et al. . |
| 5,180,750 | 1/1993 | Sugayo et al. . |

FOREIGN PATENT DOCUMENTS

| | | |
|---|---|---|
| 0330772 | 9/1989 | European Pat. Off. . |
| WO8707623 | 12/1987 | PCT Int'l Appl. . |
| WO9006168 | 6/1990 | PCT Int'l Appl. . |

*Primary Examiner*—Kathryn Gorgos
*Attorney, Agent, or Firm*—Oblon, Spivak, McClelland, Maier & Neustadt

[57] ABSTRACT

A method for hydrogen ion-selective electrodialysis, wherein from an aqueous solution containing hydrogen ions on an anode side, the hydrogen ions are selectively permitted to permeate through a membrane to a cathode side, wherein the membrane is a double layer ion exchange membrane comprising an anion exchanger layer on the anode side and a cation exchanger layer on the cathode side, and the anion exchanger layer has an ion exchange capacity of from 0.5 to 4 meq/g dry resin, a fixed ion concentration of from 1 to 10 meq/g $H_2O$, a thickness of from 0.1 to 150 μm and an electrical resistance of at most 1 $\Omega \cdot cm^2$ as measured in a 0.5 mol/l sulfuric acid solution.

5 Claims, No Drawings

METHOD FOR HYDROGEN ION-SELECTIVE ELECTRODIALYSIS

FIELD OF THE INVENTION

The present invention relates to a method for hydrogen ion-selective electrodialysis, wherein from an aqueous solution containing hydrogen ions on an anode side, the hydrogen ions are selectively permitted to permeate through a membrane to a cathode side. More particularly, it relates to a method for hydrogen ion-selective electrodialysis useful for recovery of a concentrated acid from a waste acid solution, for pH adjustment of an acidic plating solution or for acid removal.

BACKGROUND OF THE INVENTION

It has already been known that a double layer membrane comprising an anion exchange layer and a cation exchange layer, functions as a so-called bipolar membrane in such a manner that when it is disposed so that its anion exchange layer side faces an anode, and an electric current is applied while a solution containing a neutral salt or alkali is contacted to the anode sided and a neutral salt or acid solution is contacted to the cathode side, water will decompose and dissociate into a hydroxyl ion and a hydrogen ion at the interface of the double layer membrane, whereupon hydroxyl ions will be formed on the anode side and hydrogen ions will be formed on the cathode side.

Further, a method is reported wherein using a unit comprising an anion exchange membrane, a bipolar membrane and a cation exchange membrane, a neutral salt is subjected to double decomposition by electrodialysis to produce an acid and an alkali. Many proposals have been made also for the preparation of a bipolar membrane useful as a water splitter which constitutes the essential element for the above-mentioned double decomposition method of a neutral salt.

For example, Japanese Examined Patent Publication No. 31860/1985 and Japanese Unexamined Patent Publications No. 205135/1987, No. 205135/1987 and No. 95235/1988 disclose a method for introducing cation exchange groups by a treatment such as sulfonation on one side of a benzene ring-containing hydrocarbon-type polymer membrane and introducing anion exchange groups such as quaternary ammonium groups on the other side.

Further, Japanese Examined Patent Publication No. 35936/1985 discloses a membrane obtained by casting a polyvinylidene fluoride solution having fine particulate cation exchange resin dispersed therein, on a cast film of a quaternary ammonium salt formed from a mixed solution of polyvinylbenzyl chloride and polyvinylidene fluoride. Japanese Examined Patent Publication No. 47235/1984 discloses a membrane having an inorganic compound such as iron chloride interposed at the laminated interface between an anion exchange membrane and a cation exchange membrane.

Further, Japanese Unexamined Patent Publication No. 1234/1985 discloses a non-crosslinked fluorine-containing bipolar membrane, wherein pendant chains of one of the layers have cation exchange groups and pendant chains of the other layer have anion exchange groups, and the backbone chain is made of a perfluorocarbon polymer.

On the other hand, it is known, for example, from Japanese Examined Patent Publication No. 28849/1985 and Japanese Unexamined Patent Publication No. 86821/1980 that these bipolar membranes are useful as ion-selective separating membranes for selective separation among ions of the same electrical charge. However, nothing has been known with respect to the selective permeability of hydrogen ions.

Further, as a membrane for selective permeation of monovalent cations, especially for selective permeation of sodium ions from sea water, it has been proposed to adsorb or bond a compound having an opposite electrical charge on the surface of a cation exchange membrane, for example, in Japanese Examined Patent Publications No. 23607/1971, No. 42082/1971, No. 3801/1972 and No. 38310/1972. Japanese Examined Patent Publication No. 3081/1972 and Japanese Unexamined Patent Publication No. 205135/1987 further disclose crosslinking or polymerization treatment after bonding the compound having the opposite electrical charge. Further, Japanese Examined Patent Publication No. 27084/1986 discloses a membrane having a thin layer of a nitrogen-containing compound formed on the surface of a cation exchange membrane by plasma polymerization. However, nothing has been indicated with respect to the hydrogen ion-selective permeability of these monovalent cation-selective permeable membranes.

With conventional monovalent ion-selective separating membranes for selective permeation of sodium ions from sea water, the permeability of sodium ions is high, and the selective permeability of hydrogen ions is inadequate. On the other hand, with conventional bipolar membranes, water is likely to be decomposed, thus leading to a drawback that hydroxyl ions formed by the decomposition of water will react with polyvalent cations contained in the acid solution as impurities to form hardly soluble precipitates.

There has been a substantial demand for a method for electrically dialyzing hydrogen ions selectively for e.g. electrodialysis for e.g. recovery of a concentrated acid from a waste acid solution or removal of an acid. Nevertheless, there has been no practical method which fully satisfies such a demand.

SUMMARY OF THE INVENTION

It is an object of the present invention to provide a novel method for hydrogen ion-selective electrodialysis which overcomes such drawbacks.

The present invention has been made to accomplish the above object and provides a method for hydrogen ion-selective electrodialysis, wherein from an aqueous solution containing hydrogen ions on an anode side, the hydrogen ions are selectively permitted to permeate through a membrane to a cathode side, wherein the membrane is a double layer ion exchange membrane comprising an anion exchanger layer on the anode side and a cation exchanger layer on the cathode side, and the anion exchanger layer has an ion exchange capacity of from 0.5 to 4 meq/g dry resin, a fixed ion concentration of from 1 to 10 meq/g $H_2O$, a thickness of from 0.1 to 150 $\mu$m and an electrical resistance of at most 1 $\Omega \cdot cm^2$ as measured in a 0.5 mol/l sulfuric acid solution.

DETAILED DESCRIPTION OF THE PREFERRED EMBODIMENTS

Now, the present invention will be described in detail with reference to the preferred embodiments.

The membrane to be used in the present invention is a double layer ion exchange membrane which basically comprises an anion exchanger layer and a cation exchanger layer. However, with a mere double layer membrane comprising an anion exchanger layer and a cation exchanger layer, the desired hydrogen ion selectivity can not be attained. Namely, with a double layer membrane having a compound containing a functional group which functions as an anion exchange group adsorbed or insolubilized after application on the surface of a cation exchange membrane, the anion exchanger layer will have a low fixed ion concentration and will have a thin film thickness, whereby monovalent cations such as sodium ions will permeate through the membrane, and the hydrogen ion selectivity tends to be low.

On the other hand, with a so-called bipolar membrane i.e. a double layer membrane comprising an anion exchanger layer excellent in non-permeability of cations and a cation exchange membrane excellent in non-permeability of anions and having a high fixed ion concentration, water is likely to be decomposed at the double layer interface and, thus, has a drawback that polyvalent cations are likely to be precipitated by the alkali formed by the decomposition of water, or the electrical voltage tends to be high. Accordingly, the critical current density tends to be low, and good hydrogen ion-selective permeability can hardly be obtained.

Under these circumstances, the present inventors have conducted extensive studies for a method of hydrogen ion-selective electrodialysis having a high critical current density for the decomposition of water and providing a high hydrogen ion-selective permeability, particularly a high selective permeation ratio of hydrogen ions/sodium ions. As a result, it has been found possible to accomplish the above object by using a double layer ion exchange membrane comprising an anion exchanger layer on the anode side and a cation exchanger layer on the cathode side, and the anion exchanger layer has an ion exchange capacity of from 0.5 to 4 meq/g dry resin, a fixed ion concentration of from 1 to 10 meq/g $H_2O$, a thickness of from 0.1 to 150 $\mu m$ and an electrical resistance of at most 1 $\Omega \cdot cm^2$ as measured in a 0.5 mol/l sulfuric acid solution.

If the fixed ion concentration of the anion exchanger layer is less than 1 meq/g $H_2O$, the permeability of sodium ions tends to be substantial, and the selective permeability of hydrogen ions tends to be low. On the other hand, if it exceeds 10 meq/g $H_2O$, decomposition of water tends to occur, although the selective permeation ratio of hydrogen ions/sodium ions may be high. Accordingly, it is preferably from 1 to 10 meq/g $H_2O$, more preferably from 2 to 6 meq/g $H_2O$.

If the thickness of the anion exchanger layer is less than 0.1 $\mu m$, the permeability of sodium ions tends to be substantial, and if it exceeds 150 $\mu m$, the permeability of hydrogen ions tends to be low, and water tends to be easily decomposed. Therefore, it is preferably from 0.1 to 150 $\mu m$, more preferably from 1 to 50 $\mu m$.

Further, if the resistance exceeds 1 $\Omega \cdot cm^2$ as measured in a 0.5 mol/l sulfuric acid solution, the permeability of hydrogen ions tends to be low. Therefore, it is usually not higher than 1 $\Omega \cdot cm^2$, preferably not higher than 0.8 $\Omega \cdot cm^2$ and at least 0.01 $\Omega \cdot cm^2$.

The double layer ion exchange membrane having selective permeability of hydrogen ions to be used in the present invention, may be prepared by any method such as by bonding a cation exchanger layer and an anion exchanger layer. However, it is particularly preferred to employ a method which comprises casting a polymer solution for forming the anion exchanger layer on the surface of a cation exchanger layer molded in the form of a film, followed by drying to form a laminated layer as thin as possible, since the electrical resistance of the resulting hydrogen ion-selective permeable membrane will be low, the adhesion of the two ion exchanger layers is good, and it is possible to obtain a double layer membrane having high and constant mechanical strength.

The cation exchanger layer molded in the form of a film preferably has an ion exchange capacity of from 0.5 to 4.5 meq/g dry resin, more preferably from 0.8 to 3.0 meq/g dry resin. The film thickness is preferably as thick as from 10 to 1,000 $\mu m$, more preferably from 50 to 500 $\mu m$.

As such a cation exchanger layer, it is possible to employ a hydrocarbon-type cation exchange membrane which is used for concentration of sea water or for concentration or desalting of an electrolyte solution, or a cation exchange membrane made of a perfluorosulfonic acid polymer, which is used for water electrolysis or for a fuel cell. Among them, it is preferred to employ a cation exchange membrane made essentially of a copolymer of styrene or its derivative with divinylbenzene and having strongly acidic cation exchange groups such as sulfonic acid groups, since such a membrane is readily available and a presents a good coating property for an anion exchanger solution to be laminated on the surface.

On the other hand, the anion exchanger layer to be formed from a polymer solution, may, for example, be a copolymer of styrene or chloromethylstyrene with divinylbenzene, a vinylpyridine-type polymer, a vinylaniline-type polymer, a vinylimidazole-type polymer, an epoxy/amine-type polymer or a fluorine-containing polymer having anion exchange groups at terminals of side chains, wherein the polymer backbone is a perfluoropolymer.

As the anion exchanger layer, it is particularly preferred to use among them an anion exchanger layer made of an aromatic polymer having in its repeating units a group of the formula -X-Ar-Y- wherein each of X and Y which may be the same or different, is an electron donative linking group, preferably -O-, -S-, a $C_{1-13}$ alkylene group or a single bond, and Ar is:

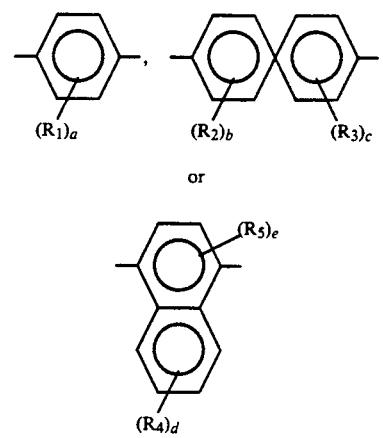

wherein each of $R_1$ to $R_5$ which may be the same or different, is a $C_{1-8}$ hydrocarbon group, a is from 0 to 4, b+c is from 0 to 6, and d+e is from 0 to 6, wherein anion exchange groups are introduced to the aromatic rings.

It is particularly preferred that such an anion exchanger layer is made of a block copolymer comprising segments having such ion exchange groups introduced thereto and segments having substantially no ion exchange groups introduced thereto, since the resulting double layer ion exchange membrane will have high hydrogen ion-selective permeability and excellent mechanical properties.

Such a block copolymer may, for example, be a polyphenylene oxide/polyethersulfone block copolymer, polyphenylene sulfide/polyethersulfone block copolymer, a polyarylethersulfone/polyethersulfone block copolymer, a polyarylether arylate/polyarylate block copolymer or a polyarylethersulfone/polythioethersulfone block copolymer. Among them, a preferred block polymer may, for example, be

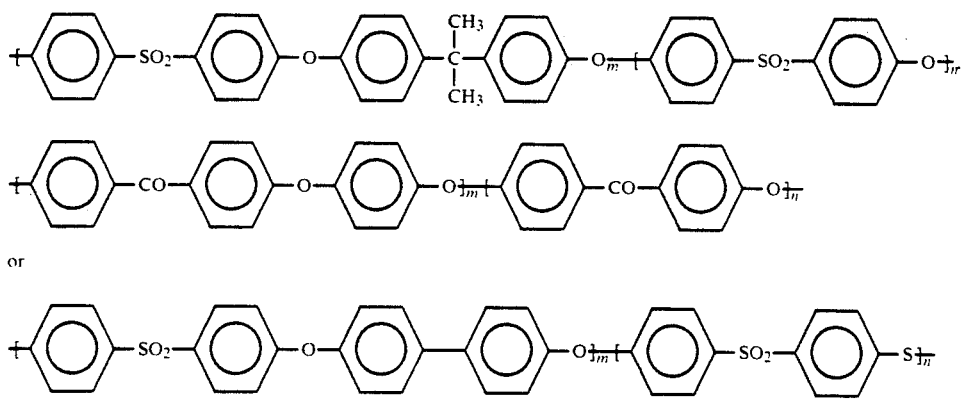

or

In the above formulas. each of m and n is from 2 to 200. and m/n is from 0.1 to 100. Such copolymers can be prepared by the methods disclosed in applicants' Japanese Unexamined Patent Publications No. 215348/1989. No. 245035/1990 and No. 248434/1990.

As a method for introducing anion exchange groups to the above-mentioned aromatic polymer having a group of the formula -X-Ar-Y- in its repeating units, it is possible to employ a method (a) wherein aminoalkyl groups are introduced to aromatic rings and if necessary converted to a quaternary ammonium salt by the reaction with an alkylhalide, a method (b) wherein hydrogen atoms on aromatic rings are reacted with haloalkyl groups for substitution and then reacted with an amine to introduce ion exchange groups, or a method (c) wherein when alkyl groups are already introduced to aromatic rings, such substituents are converted to haloalkyl groups, and then weakly basic anion exchange groups of a primary to tertiary amine are introduced by $NH_3$ or a primary or secondary amine, or strongly basic ion exchange groups of a quaternary ammonium salt are introduced by a tertiary amine. Among them, the haloalkylation-amination reaction of the method (b) or (c) is preferably used, since the reaction is easy, the control of the ion exchange capacity is easy, and introduction of ion exchange groups having different ionic strength is easy. and cross-linkage can be introduced by utilizing the reactivity of the haloalkyl groups.

As a method for introducing haloalkyl groups, it is possible to employ a chloromethylation reaction of an electrophilic reactive agent such as chloromethylmethyl ether, 1,4-bis(chloromethoxy)butane, 1-chloromethoxy-4-chlorobutane, formalin-hydrogen chloride or paraformaldehyde-hydrogen chloride for the method (b). As the method (c), it is possible to employ a method wherein substituents are directly halogenated by chlorine or bromine, a method wherein bromination is conducted in the presence of light by means of N-bromosuccinoimide, or a method wherein halogenation is conducted in the presence of a phase transfer catalyst.

The halomethylated polymer for the anion exchanger thus obtained, can be formed into a double layer ion exchange membrane preferably by the following methods. (1) The chloromethylated polymer is solubilized. and an amine is added thereto to obtain an anion exchange resin solution, which is then cast on a cation exchanger layer to form a double layer. (2) The chloromethylated polymer is solubilized and then cast on a cation exchanger layer to form a double layer, followed by contacting with $NH_3$ or a primary to tertiary amine to convert chloromethyl groups to basic ion exchange groups. (3) The chloromethylated polymer is solubilized, a part of chloromethyl groups, preferably from 20 to 80 mol %. are reacted with a tertiary amine to obtain an anion exchange resin solution, which is then cast on a cation exchanger layer to form a double layer. and then the remaining chloromethyl groups are heat-treated, contacted with a Lewis acid or reacted with an amine having at least two amino groups. to introduce cross linking structures.

The anion exchanger layer in the double layer ion exchange membrane thus obtained has a total ion exchange capacity of from 0.5 to 4 meq/g dry resin, preferably from 0.8 to 3.5 meq/g dry resin, particularly as high as from 1.0 to 3.0 meq/g dry resin. In spite of such a high ion exchange capacity, it has a fixed ion concentration of from 1 to 10 meq/g $H_2O$, preferably from 2 to 6 meq/g $H_2O$, and a layer thickness of from 0.1 to 150 μm, preferably from 1 to 50 μm, more preferably from 5 to 25 μm. With respect to the hydrogen ion-selective permeability of the obtained double layer ion exchange membrane, the permeation rate ratio of hydrogen ions to sodium ions is as high as at least 20, in some cases, at least 50.

The double layer ion exchange membrane to be used in the present invention, can be reinforced by a porous substrate to impart high mechanical strength to give excellent dimensional stability and handling efficiency. A porous substrate such as woven fabric, knitted fabric or non-woven fabric may be embedded to the cation exchanger layer so that the substrate itself is an integral part of the reinforced double layer ion exchange membrane. Otherwise, a layered porous substrate and the double layer ion exchange membrane layer may be laminated to obtain a reinforced composite membrane. The shape of the double layer ion exchange membrane is not limited to a usual flat shape, and may be an envelope shape, a hollow fiber structure or a tube structure.

The double layer ion exchange membrane thus obtained, is disposed between an anode and a cathode so that the anion exchanger layer faces the anode and used for electrodialysis wherein hydrogen ions on the anode side are permitted to permeate through the membrane to the cathode side.

In such a case, the current density to be applied, is at a level of not higher than the critical current density so that no decomposition of water takes place in the double layer ion exchange membrane, preferably within a range of at least ½ of the critical current density. With respect to the method for carrying out the electrodialysis, a conventional method can be employed, and with respect to the apparatus, any conventional apparatus such as a water tank type or a filter press type, can be used.

Now, the present invention will be described in further detail with reference to Examples. However, it should be understood that the present invention is by no means restricted to such specific Examples.

EXAMPLE 1

In the same manner as the synthesis disclosed in U.S. Pat. No. 4,654,410, 4,4-diphenol and dichlorophenylsulfone were reacted to obtain a precursor having an intrinsic viscosity of 0.22 comprising units of an aromatic polysulfone. Then, the precursor, dichlorodiphenylsulfone and sodium sulfide were reacted to obtain a block copolymer A having a structure of the following formula and an intrinsic viscosity of 0.65 comprising an aromatic polysulfone and a polythioethersulfone in equimolar amounts.

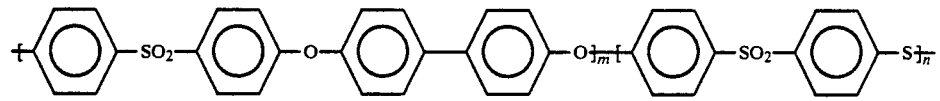

Then, the copolymer A was reacted With chloromethyl methyl ether in the presence of tin chloride to obtain a chloromethylated copolymer B. From the NMR measurement of the copolymer B, it was found that chloromethyl groups were selectively introduced to 92% of aromatic rings of diphenol. The obtained copolymer (B) was dissolved in dimethylformamide and then reacted with trimethylamine to obtain an anion exchange resin solution C1 having an ion exchange capacity of 2.0 meq/g dry resin.

The obtained anion exchange resin solution C1 was cast on one side of a cation exchange membrane (made of a sulfonated product of a styrene-divinylbenzene copolymer and having an ion exchange capacity of 1.8 meq/g dry membrane and a thickness of 110 μm), followed by heating and drying at 50° C. for 16 hours to obtain a double layer ion exchange membrane D1 composed of an anion exchanger layer having a thickness of 20 μm and a cation exchanger layer, which was then immersed in water at 40° C. to hydrate ion exchange groups.

The obtained double layer ion exchange membrane D1 was disposed so that the anion exchanger layer faced the anode, and the electrolytic cell was partitioned into two compartments. To an anode compartment, an aqueous sulfuric acid containing 0.5N hydrogen ions, 2.5N nickel ions, 2.0N zinc ions and 1.0N sodium ions, was filled, and to the other cathode compartment, 0.5N sulfuric acid was filled, whereupon the current density was changed at 80° C. to examine the change in the voltage across the membrane, whereby at a current density of at least 10 A/dm², a sharp increase in the voltage was observed. The membrane was taken out and examined, whereby precipitation of nickel hydroxide was observed on the anion exchanger layer on the anode side, and the critical current density was determined to be 10 A/dm².

Then, using a separate double layer ion exchange membrane D1, electrodialysis was conducted at 80° C. at 7 A/dm², whereby the current efficiencies of the cations M permeating to the cathode side and hydrogen ions permeating to the anode side were calculated, and the hydrogen ion-selective permeability $RS_M{}^H$ was obtained by the following formula.

$RS_M{}^H$ = (Current efficiency of hydrogen ions/Current efficiency of cations M)/(Hydrogen ion concentration on the anode side/Cation M concentration on the anode side)

As a result, the selectivity of hydrogen ions/nickel ions $RS_{Ni}{}^H$ = 160, the selectivity of hydrogen ions/zinc ions $RS_{Zn}{}^H$ = 110 and the selectivity of hydrogen ions/sodium ions $RS_{Na}{}^H$ = 60. Further, using an anion exchange resin solution C1, a single layer anion exchange membrane having a thickness of 20 μm was prepared, and its fixed ion concentration and the membrane resistance in 0.5M sulfuric acid were measured and found to be 3 meq/g H₂O and 0.15 Ω·cm², respectively.

COMPARATIVE EXAMPLE 1

Using only the cation exchange membrane used for the preparation of the double layer ion exchange membrane in Example 1, the hydrogen ion-selective permeability was obtained by the electrodialysis conducted in the same manner as in Example 1. As a result, $RS_{Ni}{}^H$ = 10, $RS_{Zn}{}^H$ = 30 and $RS_{Na}{}^H$ = 4.

EXAMPLE 2

A double layer ion exchange membrane D2 was prepared in the same manner as in Example 1 except that instead of the anion exchange resin solution C1 in Example 1, an anion exchange resin solution having an ion exchange capacity of 1.6 meq/g dry resin, hereinafter designated C2, was used. The critical current density of the obtained double layer ion exchange membrane was 8 A/dm². The hydrogen ion-selective permeability was obtained by electrodialysis at a temperature of 80° C. at a current density of 6 A/dm², whereby $RS_{Ni}{}^H$ = 300, $RS_{Zn}{}^H$ = 150 and $RS_{Na}{}^H$ = 100.

Further, a single layer anion exchange membrane having a thickness of 20 μm was prepared by using the anion exchange resin solution C2, and its fixed ion concentration and the membrane resistance in 0.5M sulfuric acid were measured and found to be 5 meq/g H₂O and 0.4 Ω·cm², respectively.

EXAMPLE 3

A double layer ion exchange membrane D3 was prepared in the same manner as in Example 1 except that instead of the anion exchange resin solution Cl in Example 1, an anion exchange resin solution having an ion exchange, capacity of 1.2 meq/g dry resin, hereinafter designated C3, was used. The critical current density of the obtained double layer ion exchange membrane was 5 A/dm$^2$. The hydrogen ion-selective permeability was obtained from the electrolytic test at a temperature of 80° C. at a current density of 4 A/dm$^2$, whereby $RS_{Ni}^H=800$, $RS_{Zn}^H=400$ and $RS_{Na}^H=200$.

Further, a single layer anion exchange membrane having a thickness of 20 μm was prepared by using the anion exchange resin solution C3, and its fixed ion concentration and the membrane resistance in 0.5M sulfuric acid were measured and found to be 8 meq/g H$_2$O and 0.8 Ω·cm$^2$, respectively.

COMPARATIVE EXAMPLE 2

A double layer ion exchange membrane was prepared in the same manner as in Example 3 except that the thickness of the anion exchanger layer having an ion exchange capacity of 1.2 meq/g dry resin was changed to 200 μm, and the membrane was hydrated in water at 25° C. The critical current density was measured and found to be 2 A/dm$^2$. Electrodialysis was conducted at a current density of 1 A/dm$^2$ which was at a level of 50% of the obtained critical current density, whereby the cell voltage increased, and the membrane was taken out and examined whereby precipitation of nickel was observed on the surface of the anion exchange membrane on the anode side.

Further, a single layer anion exchange membrane having a thickness of 200 μm was prepared by using the anion exchange resin solution C3, and its fixed ion concentration and the membrane resistance in 0.5M sulfuric acid were measured and found to be 12 meq/g H$_2$O and 8 Ω·cm$^2$, respectively.

EXAMPLE 4

A syrup solution having nitrile rubber dissolved in a chloromethylstyrene monomer containing 8% of divinylbenzene, was impregnated and polymerized to vinyl chloride, followed by amination with trimethylamine to obtain an anion exchange membrane having a thickness of 120 μm, an ion exchange capacity of 2.0 meq/g dry membrane, a fixed ion concentration of 6 meq/g H$_2$O and a membrane resistance of 0.9 Ω·cm$^2$ as measured in 0.5M sulfuric acid.

On one side of the obtained anion exchange membrane, an ethanol solution of a copolymer of $CF_2=CF(OCF_2CFCF_3)O(CF_2)_2SO_3H$ with ethylene tetrafluoride having an ion exchange capacity of 1.1 meq/g dry resin, was coated and heated to obtain a double layer ion exchange membrane El having a cation exchanger layer laminated in a thickness of 20 μm. The critical current density was measured in the same manner as in Example 1 and found to be 4 A/dm$^2$. The hydrogen ion-selective permeability was obtained by an electrolytic test at a temperature of 80° C. at 3 A/dm$^2$, whereby $RS_{Ni}^H=400$, $RS_{Zn}^H=200$ and $RS_{Na}^H=150$.

COMPARATIVE EXAMPLE 3

A syrup solution having nitrile rubber dissolved in a chloromethylstyrene monomer containing 15% of divinylbenzene, was impregnated and polymerized to vinyl chloride, followed by amination with trimethylamine to obtain an anion exchange membrane having a thickness of 200 μm, an ion exchange capacity of 1.9 meq/g dry membrane, a fixed ion concentration of 12 meq/g H$_2$O and a membrane resistance of 2.5 Ω·cm$^2$ as measured in 0.5M sulfuric acid.

On the obtained anion exchange membrane, a cation exchanger layer was laminated in the same manner as in Example 4 to obtain a double layer ion exchange membrane, and the critical current density of the double layer ion exchange membrane was measured and found to be 3 A/dm$^2$. Electrodialysis was conducted at a current density of 1.5 A/dm$^2$ which was at a level of 50% of the obtained critical current density, whereby the cell voltage increased, and the membrane was taken out and examined, whereby precipitation of nickel was observed on the surface of the anion exchange layer on the anode side.

EXAMPLE 5

The double layer ion exchange membrane in Example 3 was immersed in a methanol solution of 0.5N N,N,N',N'-tetramethyldiaminopropane to obtain a crosslinked double layer ion exchange membrane D4. The critical current density of the obtained double layer ion exchange membrane was 12 A/dm$^2$. The hydrogen ion-selective permeability was obtained by the electrodialysis at a temperature of 80° C. at a current density of 10 A/dm$^2$, whereby $RS_{Ni}^H=130$, $RS_{Zn}^H=130$ and $RS_{Na}^H=30$.

Further, a single layer anion exchange membrane having a thickness of 20 μm was prepared by using the anion exchange resin solution C3, and its fixed ion concentration and the membrane resistance in 0.5M sulfuric acid were measured and found to be 4.0 meq/g H$_2$O and 0.12 Ω·cm$^2$, respectively.

The double layer ion exchange membrane used in the present invention has a low membrane resistance, a high hydrogen ion-selective permeability and a high critical current density to avoid decomposition of water. Thus, electrodialysis can be conducted at a high current density. Therefore, it can advantageously be used for recovery of a concentrated acid of a high purity from a waste acid solution with a low concentration or for an acid removal process such as pH adjustment.

We claim:

1. A method for hydrogen ion-selective electrodialysis, comprising selectively permeating on an anode side hydrogen ions from an aqueous solution containing hydrogen ions through a membrane to a cathode side, wherein the membrane is a double layer ion exchange membrane comprising an anion exchanger layer on the anode side and a cation exchanger layer on the cathode side, and the anion exchanger layer has an ion exchange capacity of from 0.5 to 4 meq/g dry resin, a fixed ion concentration of from 1 to 10 meq/g H$_2$O, a thickness of from 0.1 to 150 μm and an electrical resistance of at most 1 Ω·cm$^2$ as measured in a 0.5 mol/l sulfuric acid solution, wherein a current density of not more than the critical current density is applied for the electrodialysis.

2. The method for hydrogen ion selective electrodialysis according to claim 1, wherein the double layer ion exchange membrane is the one obtained by casting a polymer solution for forming the anion exchanger layer, on a cation exchanger layer molded in the form of a film, followed by drying for lamination.

3. The method for hydrogen ion selective electrodialysis according to claim 1 or 2, wherein the anion exchanger layer is made of a block copolymer comprising segments consisting essentially of aromatic rings and linking groups and having anion exchange groups introduced thereto and segments consisting essentially of aromatic rings and linking groups and having substantially no anion exchange groups introduced thereto.

4. The method for hydrogen ion selective electrodialysis according to claim 1 or 2, wherein the cation exchanger layer is a strongly acidic cation exchange membrane consisting essentially of a copolymer of styrene or its derivative with divinylbenzene.

5. The method for hydrogen ion-selective electrodialysis according to claim 1 or 2, wherein a current density of not more than the critical current density and at least ½ of the critical current density, is applied.

* * * * *